F. T. DICKINSON.
BRAKE SHOE.
APPLICATION FILED OCT. 18, 1907. RENEWED NOV. 30, 1910.
996,623.
Patented July 4, 1911.
2 SHEETS—SHEET 1.
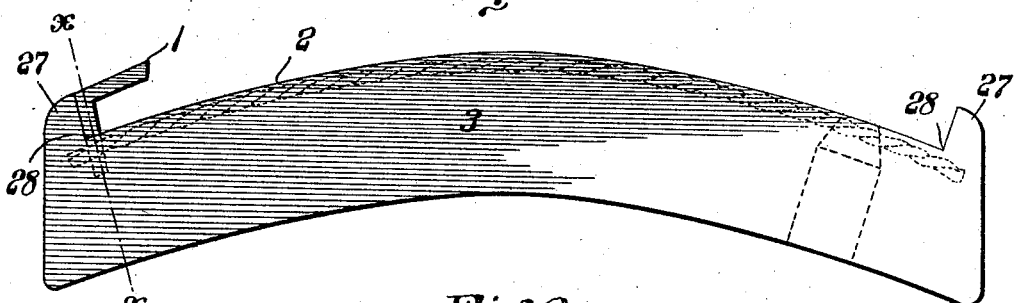
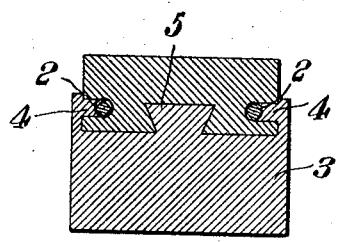
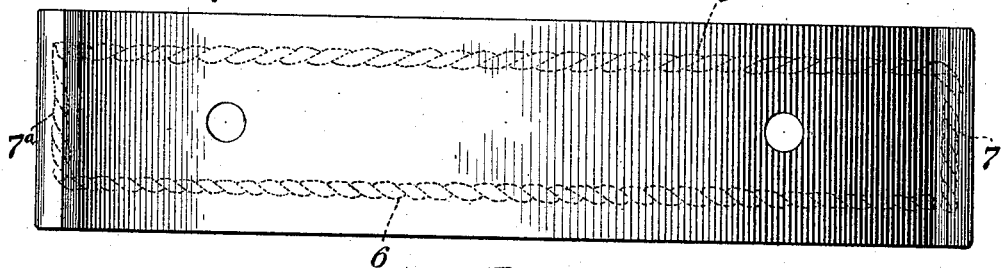
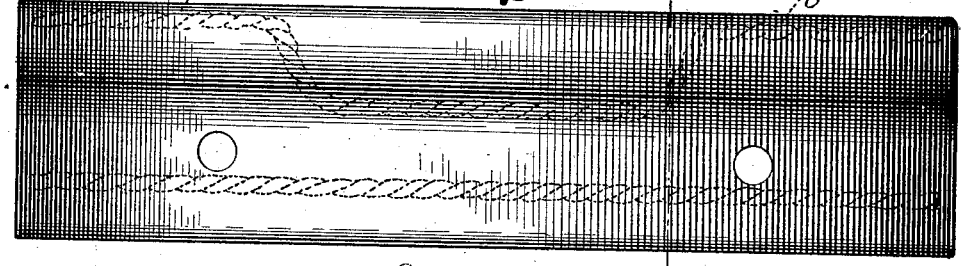
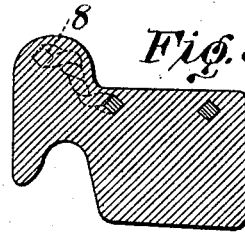
Witnesses:
Harvey L. Lechner
Archworth Martin
Inventor,
Frank T. Dickinson
By his Attys.
Synnestvedt & Carpenter
COLUMBIA PLANOGRAPH CO., WASHINGTON, D. C.

F. T. DICKINSON.
BRAKE SHOE.
APPLICATION FILED OCT. 18, 1907. RENEWED NOV. 30, 1910.
996,623.
Patented July 4, 1911.
2 SHEETS—SHEET 2.
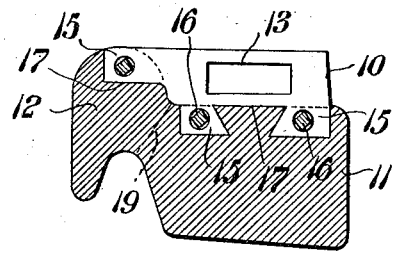
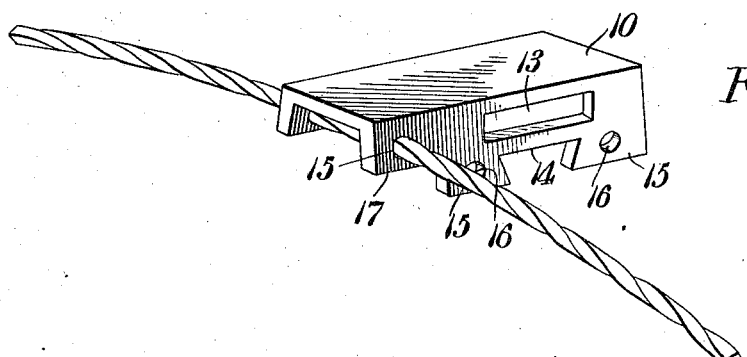
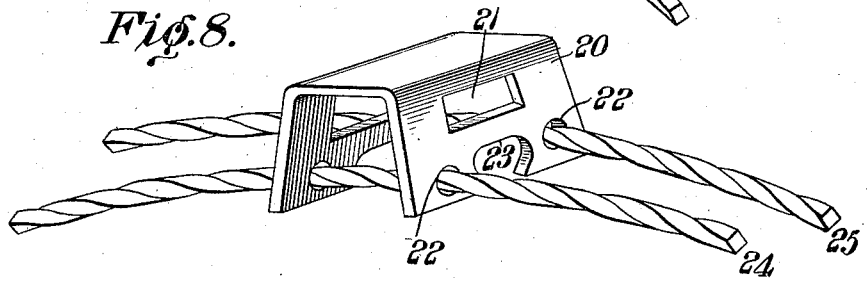
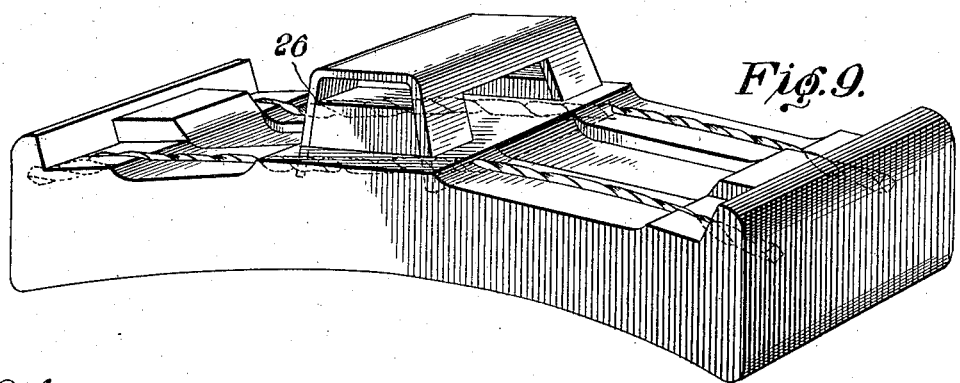
Witnesses:
Harvey L Lechner
Archworth Martin
By his Attys.
Inventor,
Frank T. Dickinson
Synnestvedt & Carpenter

UNITED STATES PATENT OFFICE.

FRANK T. DICKINSON, OF CHICAGO, ILLINOIS.

BRAKE-SHOE.

996,623. Specification of Letters Patent. Patented July 4, 1911.

Application filed October 18, 1907, Serial No. 397,995. Renewed November 30, 1910. Serial No. 594,975.

*To all whom it may concern:*

Be it known that I, FRANK T. DICKINSON, a citizen of the United States, residing at Chicago, in the county of Cook and State of Illinois, have invented certain new and useful Improvements in Brake-Shoes, of which the following is a specification.

The invention relates to friction blocks used as a brake on railway cars, engines, etc., and in particular to friction blocks having a cast body portion and an attaching or securing lug and a connecting member all adapted to be permanently bound together when the body portion is cast.

It has for its objects to provide a reinforcement for the cast body of the shoe, to provide a reinforcement and attaching means for the attaching lug, to provide a means for binding all the parts of the shoe securely together, to provide a shoe simple and easy of construction embodying these elements, and to provide a form of construction with such elements present which is simple and convenient in the production of shoes of a great variety of types and widely different use. These and other objects which will hereinafter appear are obtained in my invention which is illustrated in preferred form in the accompanying drawings wherein, Figure 1 is a longitudinal section of a driver shoe showing the hook and a connecting member in position, Fig. 2 is a cross section on line X—X of Fig. 1, Fig. 3 is a top plan view showing a type of connecting means for a bald driver shoe, Fig. 4 is a top plan view showing connecting means used in a flange car shoe, Fig. 5 is a cross section on Y—Y Fig. 4, Fig. 6 is a cross section of a flange shoe adjacent the securing lug, Fig. 7 is the securing lug of Fig. 6 with the flange connecting member attached, Fig. 8 is a securing lug with the connecting members attached as used in construction of a car shoe, and Fig. 9 is a completed car shoe showing the securing lug and the connecting members in place.

The connecting member provided in this invention is of steel or wrought iron, and is formed by twisting a bar of metal which may be varied in shape and size, but which is preferably constructed of a square bar. The member is approximately the same length as the shoe or sufficiently long to extend beyond the end lugs thereof thus enabling it to bind all parts of the shoe together. When a plurality of connecting members is provided, as is the case in the preferred form of the invention, the members run approximately parallel to one another. In the middle of the shoe, where means, as will be hereinafter described, are provided for attaching the connecting member to the securing lug of the shoe and at the ends of the shoe adjacent the end lugs thereof where the back of the shoe contacts with the brake head the connecting member is embedded in the body portion of the shoe or is permitted to be just flush with the back thereof; while the intermediate portion, where the back of the shoe is somewhat depressed (as will appear in Fig. 9) to save metal and reduce weight, this member is permitted to extend some distance above the outside of the body portion of the shoe, which will relieve this member as much as possible from the effect of the heat developed in the shoe when the brakes are applied. The securing lug is provided with holes or slots to receive the connecting member therethrough thus locking these elements securely together when the body portion of the shoe is cast. By twisting the connecting members the power of resistance against breakage is increased and they present a surface which will prevent the bar being drawn out of the shoe lengthwise after the body portion is cast about the same, as is often the case with a bar presenting a straight surface, due to the shrinkage of the metal or other causes. It will be seen that a brake shoe is thus obtained with a cast body portion a securing lug and a connecting member for connecting the parts of the shoe and the securing lug together and in which these elements are securely locked together when the body portion of the shoe is cast. And further, that a simple construction is provided which is equally efficient and convenient in the production of a great variety of shoes adapted to a widely different use.

Fig. 1 is a longitudinal view showing a connecting member of a driver shoe embodying this invention. 3 is the body portion of the shoe, 1 is the hook, and 2 is the connecting member which in this type of shoe is slightly embedded in the outer side thereof.

Fig. 2 is a cross section on X—X of Fig. 1 showing the slots 4 in the hook 1 for receiving the connecting members 2 and the slot 5 for receiving metal of the body portion when the same is cast. It will thus be obvious that the slot 5 and the members 2 will secure the hook against falling out of the body of the shoe until the same is practically worn out. And on account of the uneven surface of the members 2 guaranteeing against any endwise movement of the same a successful locking of all the elements is obtained. The members 2 extending the full length, and in certain cases one or both of these members lapping over and traversing the width of the shoe as shown in Figs. 4 and 3, it will be seen that in case of breakage any portion broken off can not become separated from the balance of the shoe. The members 2 are extended beyond the end lugs 27 thereby strengthening the shoe at points 28 where it is required to sustain heavy weight and preventing the loss of the end of the shoe if broken off.

Fig. 3 illustrates the manner in which the connecting member is employed in a bald driver shoe. The members are arranged one on each side of the shoe extending throughout its length and each turning at right angles and extending across the respective ends of the shoe as indicated at 7 and 7ª. This arrangement reinforces the entire shoe and guards completely against loss of any portion thereof if the shoe is broken.

Figs. 4 and 5 show a flange car shoe. It will be observed in this type of shoe that the connecting member traverses the main body portion of the shoe at its ends 8 and at approximately one-third the length of the shoe a portion 9 of the connecting member is turned into and traverses the flange portion of the shoe. Fig. 5 is a cross section of Fig. 4 and shows the position of the connecting member where it connects the main body portion and the flange portion of the shoe. A connecting member is also provided extending the full length of the main body portion of the shoe as shown.

Figs. 6 and 7 show another type of flange shoe in which the attaching lug 10 is adapted to bind the flange portion to the main body portion. Fig. 6 is a cross section of the shoe adjacent the attaching lug 10, and Fig. 7 shows the lug with the flange connecting member 15 attached. The lug is provided with slot 13 for joining the brake head, slot 14 for receiving metal and attaching the lug to the main body portion when the shoe is cast, and with projections 15 provided with eyes 16, or these may as preferred be slots 4 as shown in Fig. 2, for receiving the connecting members which traverse the body portion of the shoe. The lug is further provided with an extension 17 secured to the flange portion of the shoe which is also provided with an eye 16 for receiving the connecting member which traverses the flange portion of the shoe. When the body portion of the shoe is cast the lug is partially embedded therein as shown in Fig. 9 and is securely joined thereto by means of its projections and the connecting members as shown. Either of these methods furnishes a secure locking together of the parts of the shoe and especially the locking of the flange portion to the body portion.

Fig. 8 is a lug with the connecting members attached which are used in the construction of a car shoe.

It will be observed that in providing the means shown for attaching the lug to the body portion of the shoe and to the connecting members, that the connecting members extend throughout approximately the entire length of the shoe, and are completely or partially embedded in the body portion thereof, as above described, and that the securing lug is also partially embedded in the body portion with the casting metal extending part way into the lug as shown at 26 in Fig. 9. A complete and secure reinforcing and locking of the parts of the shoe is thus obtained.

Having thus described my invention and illustrated its use, what I claim as new, and desire to secure by Letters Patent, is the following:

1. A brake shoe comprising a cast metal body portion, an attaching lug, and a bar of twisted metal engaging the said lug, substantially as described.

2. In combination in a brake shoe, a cast metal body, an attaching lug, and a bar of twisted metal, all adapted to be securely locked together when the body portion is cast, substantially as described.

3. A brake shoe comprising a cast body portion, an attaching lug provided with slotted projections to be embedded in and lock the lug securely to the body portion when cast, and a bar of twisted steel passing through the slots in the said lug and traversing the length of the shoe and adapted to become an integral part thereof when the body portion is cast, substantially as described.

4. A brake shoe comprising a cast metal body portion, an attaching lug secured to said body portion, and a bar of twisted steel passing through the said lug and adapted to be embedded in the body portion of the shoe when the same is cast, substantially as described.

5. A brake shoe comprising a cast body portion, an attaching lug secured to the said body portion, and a bar of twisted steel passing through the said lug and completely embedded at the ends and the middle of the said body portion and to be partially embedded throughout the intervening portions of its extent when the shoe is cast, substantially as described.

6. A flange brake shoe comprising a cast body portion, an attaching lug secured to the said body portion, and a bar of twisted steel passing through the said lug and traversing for a portion of its extent the main body portion of the shoe and throughout its remaining length the flange portion of the shoe, substantially as described.

7. A flange brake shoe comprising a cast body portion and flange portion, an attaching lug secured to the body portion and the flange portion of the shoe, and bars of twisted steel passing through the said lug in the body portion and in the flange portion, substantially as described.

8. A driver shoe comprising a cast body portion, a lug provided with slotted projections attached to the said body portion for the insertion of bars of twisted steel forming connecting members each of which members extends throughout the length of the shoe and alternately across the ends thereof, substantially as described.

9. A driver shoe comprising a cast body portion, a hook with a slot to receive cast metal and apertures for the insertion of bars of twisted steel forming connecting members and traversing the length of the shoe, substantially as described.

10. A driver shoe provided with two connecting elements each traversing the length of the shoe and the one turning at right angles and traversing one end of the shoe beneath the end lug and the other element turning at right angles in the opposite direction and traversing the opposite end of the shoe beneath the end lug at said end of the shoe, substantially as described.

In testimony whereof I have hereunto signed my name in the presence of the two subscribing witnesses.

FRANK T. DICKINSON.

Witnesses:
PAUL CARPENTER,
G. W. CUNNINGHAM.

---

Copies of this patent may be obtained for five cents each, by addressing the "Commissioner of Patents, Washington, D. C."